(12) United States Patent
Zanger et al.

(10) Patent No.: US 9,306,860 B2
(45) Date of Patent: Apr. 5, 2016

(54) CONGESTION CONTROL METHOD FOR DYNAMICALLY MAXIMIZING COMMUNICATION LINK THROUGHOUT

(71) Applicant: Giraffic Technologies Ltd., Tel Aviv (IL)

(72) Inventors: Yoel Zanger, Tel Aviv (IL); Gil Gat, Tel Aviv (IL); Offer Atziz, Tel Aviv (IL); Stanislav Tulchin, Ramat Gan (IL); Sharon Malkiel, Azur (IL)

(73) Assignee: Giraffic Technologies LTD., Tel Aviv (IL)

( * ) Notice: Subject to any disclaimer, the term of this patent is extended or adjusted under 35 U.S.C. 154(b) by 0 days.

(21) Appl. No.: 14/420,394

(22) PCT Filed: Oct. 14, 2013

(86) PCT No.: PCT/IB2013/059334
§ 371 (c)(1),
(2) Date: Feb. 9, 2015

(87) PCT Pub. No.: WO2014/060927
PCT Pub. Date: Apr. 24, 2014

(65) Prior Publication Data
US 2015/0207743 A1    Jul. 23, 2015

Related U.S. Application Data

(60) Provisional application No. 61/715,322, filed on Oct. 18, 2012.

(51) Int. Cl.
*H04L 12/825*    (2013.01)
*H04L 29/06*    (2006.01)
(Continued)

(52) U.S. Cl.
CPC ............... *H04L 47/25* (2013.01); *H04L 29/06* (2013.01); *H04L 47/12* (2013.01); *H04L 47/365* (2013.01); *H04L 65/4084* (2013.01); *H04L 65/601* (2013.01); *H04L 65/80* (2013.01);
(Continued)

(58) Field of Classification Search
CPC .......... H04L 29/06; H04L 67/10; H04L 47/12
See application file for complete search history.

(56) References Cited

U.S. PATENT DOCUMENTS

| 6,049,892 A * | 4/2000 | Casagrande ............ H04L 29/06 714/18 |
| 6,339,785 B1 * | 1/2002 | Feigenbaum ........... H04L 29/06 709/213 |

(Continued)

FOREIGN PATENT DOCUMENTS

| CN | 101656751 A | 2/2010 |
| CN | 102811258 A | 12/2012 |

OTHER PUBLICATIONS

International Search Report in PCT/IB2013/059334 dated Apr. 9, 2014.

*Primary Examiner* — Lashonda Jacobs
(74) *Attorney, Agent, or Firm* — Manelli Selter PLLC; Edward J. Stemberger (57) ABSTRACT

A congestion control system and method for dynamically maximizing a communication link throughput is presented. The method involves monitoring and managing a variable number of streams from one or more URLs and their respective download fragment size in order to maximize the changing link capacity. The number of participating streams is adjusted according to total link congestion status.

21 Claims, 7 Drawing Sheets

(51) Int. Cl.
  *H04L 12/801* (2013.01)
  *H04N 21/2343* (2011.01)
  *H04N 21/24* (2011.01)
  *H04N 21/262* (2011.01)
  *H04N 21/845* (2011.01)
  *H04L 29/08* (2006.01)
  *H04L 12/805* (2013.01)
  *H04L 12/811* (2013.01)
  *H04L 12/26* (2006.01)

(52) U.S. Cl.
  CPC ..... *H04N21/23439* (2013.01); *H04N 21/2402* (2013.01); *H04N 21/26258* (2013.01); *H04N 21/8456* (2013.01); *H04L 43/0888* (2013.01); *H04L 47/36* (2013.01); *H04L 47/38* (2013.01); *H04L 67/10* (2013.01); *H04L 67/32* (2013.01)

(56) References Cited

U.S. PATENT DOCUMENTS

| | | | | |
|---|---|---|---|---|
| 6,606,646 | B2 * | 8/2003 | Feigenbaum | H04L 29/06 709/203 |
| 8,825,886 | B2 * | 9/2014 | Lei | H04N 21/2402 709/231 |
| 2002/0178261 | A1 * | 11/2002 | Chang | H04L 29/06 709/225 |
| 2005/0180320 | A1 * | 8/2005 | Yeh | H04Q 3/0062 370/229 |
| 2006/0031537 | A1 * | 2/2006 | Boutboul | H04L 67/10 709/228 |
| 2008/0133771 | A1 | 6/2008 | Vardi et al. | |
| 2008/0250103 | A1 | 10/2008 | Bar-Yaacov et al. | |
| 2014/0149556 | A1 * | 5/2014 | Pang | H04L 67/10 709/219 |

* cited by examiner

CONGESTION CONTROL METHOD FOR DYNAMICALLY MAXIMIZING COMMUNICATION LINK THROUGHOUT

CROSS-REFERENCE TO RELATED PATENT APPLICATIONS

This patent application claims priority from and is related to U.S. Provisional Patent Application Ser. No. 61/715,322, filed Oct. 18, 2012, this U.S. Provisional Patent Application incorporated by reference in its entirety herein.

TECHNICAL FIELD

The present invention relates to the field of computer networks, and more particularly, to streaming data files in such networks.

BACKGROUND

A common problem encountered by many internet users is re-buffering pauses during video streams. This phenomenon is in particular frequent when the actual end-users internet connection capacity/throughput is very close to that of the stream quality being consumed, or when the video source is remote from the end user and requires intersecting over multiple networks examples are:
Shared Wi-Fi connections
3G Mobile networks.
Crowded High speed links (Cable)
Low quality (high packet loss) links in developing countries
Local ISP connection is stronger than outboard ISP connection and can't be fully utilized (example: end-user has 5 Mbps ADSL line, but is actually downloading at 2 Mbps speed).
Poor routing, but Server and Client connectivity is actually strong.

Many attempts have been made to reduce buffering by adjusting the streaming protocol congestion control mechanism, adjusting compression rate or changing the stream bitrate dynamically with the changing condition of the link (e.g. Adobe Http Dynamic Streaming).

Using several streams for downloading a file has been previously proposed. However such attempts concentrated either on downloading a whole file or streaming a media file while considering its playing bitrate for calculating fragment download (see U.S. Pat. No. 8,224,981 and references therein).

Adaptive streaming protocols such as Apples' HLS, Adobe HDS, Microsoft Smooth Streaming or MPEG-DASH use several versions of the same file (usually with different quality levels) to adapt to the changing link bandwidth. In order to enable smooth transition between the various quality levels the files are usually fragmented into chunks. The player receives a manifest file describing the list of fragments (and how to retrieve them i.e. URLs/URL pattern) for any particular quality (resolution) level. The typical player then starts downloading the fragments serially while measuring the performance/bandwidth and decides upon changing quality level accordingly.

SUMMARY

According to an aspect of the present invention there is provided a congestion control method of dynamically maximizing communication link download throughput, comprising dynamically creating and deleting concurrent download session from one or more URLs and dynamically changing the size of data chunks for each session by continuously monitoring the overall congestion status of said link.

The monitoring may comprise: selecting a current strategy defining a number of concurrent download session and the duration of each session; downloading data from said one or more URLs using the current strategy, periodically checking whether said defined number of concurrent download session are active and whether the current strategy should be replaced by a new strategy; and selecting a new current strategy if said checking indicates a strategy that can better utilize the download throughput.

The periodical checking whether said defined number of concurrent download session are active may comprise: a. if a first active session has terminated, determining whether to start download of the next data chunk or discard sessions; b. if a next download session is pending, defining it as active and repeating step (a); and c. adding pending download sessions if current number of sessions is smaller than said total number of concurrent download session defined by the current strategy.

The periodical checking whether the current strategy should be replaced by a new strategy may comprise checking download throughput when a strategy change has been performed during said period, comprising: if the currently measured total download speed is greater than the total download speed measured in the previous period, increasing the number of target concurrent sessions; and calculating a new data chunk size.

Increasing may comprise increasing the number of target concurrent sessions according to the difference between said currently measured total download speed and said total download speed measured in the previous period.

The periodical checking may comprise checking download throughput when no strategy change has been performed during said period comprising: if the currently measured total download speed is smaller by at most a predefined percentage than the maximum download speed measured for the current strategy, selecting a new strategy having the highest worst measured download speed; if the currently measured total download speed is greater by a at least predefined percentage than a calculated best download speed for the current strategy, selecting a new strategy having the highest best predefined download speed; and calculating a new data chunk size.

According to another aspect of the present invention there is provided a congestion control system for dynamically maximizing communication link download throughput, comprising a download session controller configured to dynamically create and delete parallel data streams from one or more URLs and dynamically change the size of data fragments for each stream by continuously monitoring the overall congestion status of said link.

The download session controller may further be configured to: select a current strategy defining a number of concurrent download session and the duration of each session; download data from said one or more URLs using the current strategy; periodically check whether said defined number of concurrent download session are active and whether the current strategy should be replaced by a new strategy; and select a new current strategy if said checking indicates a strategy that can better utilize the download throughput.

The periodical checking whether said defined number of concurrent download session are active may comprise: a. if a first active session has terminated, determining whether to start download of the next data chunk or discard sessions; b. if a next download session is pending, defining it as active and repeating step (a); and c. adding pending download sessions if current number of sessions is smaller than said total number of concurrent download session defined by the current strategy.

The periodical checking whether the current strategy should be replaced by a new strategy may comprise checking download throughput when a strategy change has been performed during said period, comprising: if the currently measured total download speed is greater than the total download speed measured in the previous period, increasing the number of target concurrent sessions; and calculating a new data chunk size.

Increasing may comprise increasing the number of target concurrent sessions according to the difference between said currently measured total download speed and said total download speed measured in the previous period.

The periodical checking may comprise checking download throughput when no strategy change has been performed during said period, comprising: if the currently measured total download speed is smaller by at most a predefined percentage than the maximum download speed measured for the current strategy, selecting a new strategy having the highest worst measured download speed; if the currently measured total download speed is greater by a at least predefined percentage than a calculated best download speed for the current strategy, selecting a new strategy having the highest best predefined download speed; and calculating a new data chunk size.

According to another aspect of the present invention there is provided a computer program product, comprising a computer readable storage medium having computer readable program embodied therein, the computer readable program configured to dynamically create and delete parallel data streams from one or more URLs and dynamically change the size of data for each stream by continuously monitoring the overall congestion status of the link.

The computer program product may further be configured to: select a current strategy defining a number of concurrent download session and the duration of each session; download data from said one or more URLs using the current strategy; periodically check whether said defined number of concurrent download session are active and whether the current strategy should be replaced by a new strategy; and select a new current strategy if said checking indicates a strategy that can better utilize the download throughput.

The computer program product may further be configured to periodically check whether said defined number of concurrent download session are active, comprising: a. if a first active session has terminated, determining whether to start download of the next data chunk or discard sessions; b. if a next download session is pending, defining it as active and repeating step (a); and c. adding pending download sessions if current number of sessions is smaller than said total number of concurrent download session defined by the current strategy.

The computer program product may further be configured to periodically checking whether the current strategy should be replaced by a new strategy, comprising checking download throughput when a strategy change has been performed during said period, comprising: if the currently measured total download speed is greater than the total download speed measured in the previous period, increasing the number of target concurrent sessions; and calculating a new data chunk size.

The increasing may comprise increasing the number of target concurrent sessions according to the difference between said currently measured total download speed and said total download speed measured in the previous period.

The periodical checking may comprise checking download throughput when no strategy change has been performed during said period, comprising: if the currently measured total download speed is smaller by at most a predefined percentage than the maximum download speed measured for the current strategy, selecting a new strategy having the highest worst measured download speed; if the currently measured total download speed is greater by a at least predefined percentage than a calculated best download speed for the current strategy, selecting a new strategy having the highest best predefined download speed; and calculating a new data chunk size.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF PEREFERRED EMBODIMENHTS

The present invention describes a method that uses congestion control mechanism to maximize the throughput of multiple connections in an efficient way thereby minimizing the problems associated with a single stream.

The following acronyms are used throughout the following description and the accompanying drawings:
CSC—Current download Sessions Count
TSC—Target download Session Count=Current overall link capacity
PSC—Previous Session Count
CDS—Current Download Speed
PDS—Previous Download Speed The following terms are used throughout the following description:

Chunk—a variable length data section specified by its start and end offset;

Fragment—a data section having a predefined length; a fragment may comprise a single chunk or be divided by the process into a number of chunks.

Each chunk can be downloaded by one or more sessions by using one or more range requests. Additionally, several chunks can be downloaded in parallel.

Current Fragment (CF)—the fragment currently requested;

Active Fragment (AF)—a fragment that is being downloaded;

Pending Fragment (PF)—a fragment that is downloaded before the player requested it;

Target Completed Fragment (TCF)—The sequential number (sequence number) of the next fragment we expect to be completed;

Pending Fragments Count (PFC)—the number of pending fragments;

Number of ACTIVE pending fragments (APC);

Last pending fragment (LPF).

Download Session—A logical entity controlling transfer of a chunk data from a URL (Uniform Resource Locator) to the client. For example: an HTTP connection between the client and http://www.youtube.com/. A download session is defined by its connection and its duration.

Adaptive session—A session which downloads entire fragments or variable length chunks of predefined fragments;

Progressive session—A session which downloads variable length chunks of a file not having predefined fragments;

Total download speed—total data (number of bytes) obtained from all sessions during a time interval divided by the time interval.

Strategy—Number of concurrent download sessions and their target download duration.

Each strategy has the following properties:

a. currentStrategyBest, defined by

```
If (currentDownloadSpeed > currentStarategyBest){
  currentStarategyBest = currentDownloadSpeed;
}Else{
  currentStrategyBest = currentStrategyBest – (currentStrategyBest –
  currentAverageSpeed)/20);
}
``` b. currentStrategyWorse, defined by:

```
If (currentDownloadSpeed < currentStarategyWorse){
  currentStarategyWorse = currentDownloadSpeed;
}Else{
  currentStarategyWorse = currentStarategyWorse +
  (currentAverageSpeed – currentStarategyWorse)/20;
}
``` c. currentStrategyMax, is defined by the maximum download speed that the current strategy measured since it was last selected as active.

d. currentStrategyMin, is defined by the minimum download speed that the current strategy measured since it was last selected as active.

The present invention provides a general mechanism independent of the content being downloaded or its play rate that uses in parallel a variable number of streams in order to maximize the link throughput at any time.

Figure 1A:
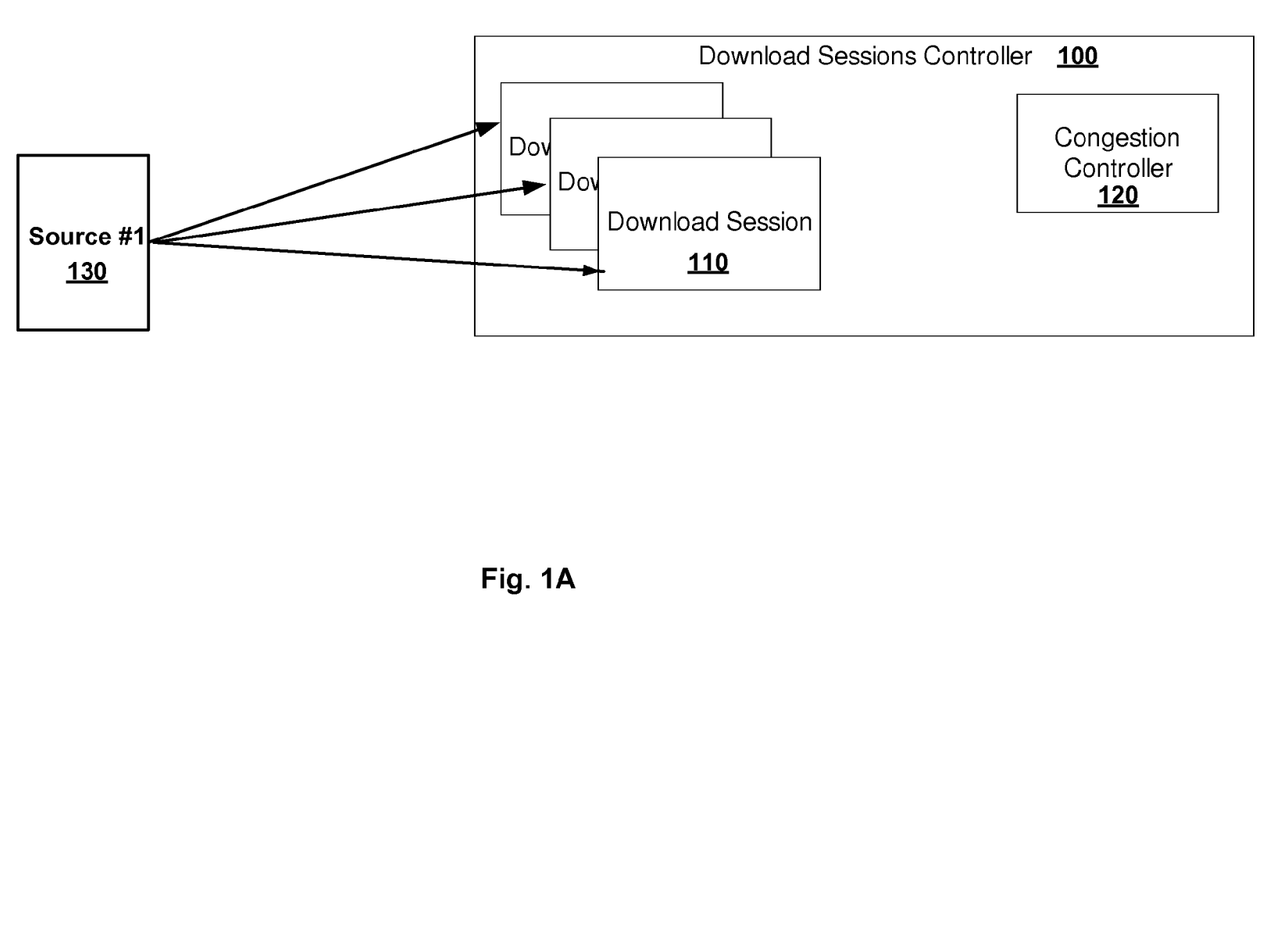
FIG. 1A schematically describes the two main entities comprising a typical multi-session download controller comprising a variable number of download sessions and a congestion controller.

FIG. 1A schematically describes the main entities of an exemplary embodiment of the invention. The Session Controller 100, which may be a software module integrated into a client application or a piece of software which is part of an operating system/firmware supplied by a client device manufacturer, is responsible for managing and monitoring a variable number of download sessions 110 from a URL (130), where a strategy for determining number of concurrent sessions, duration of each session and/or fragment size is determined by the congestion controller 120.

Figure 1B:
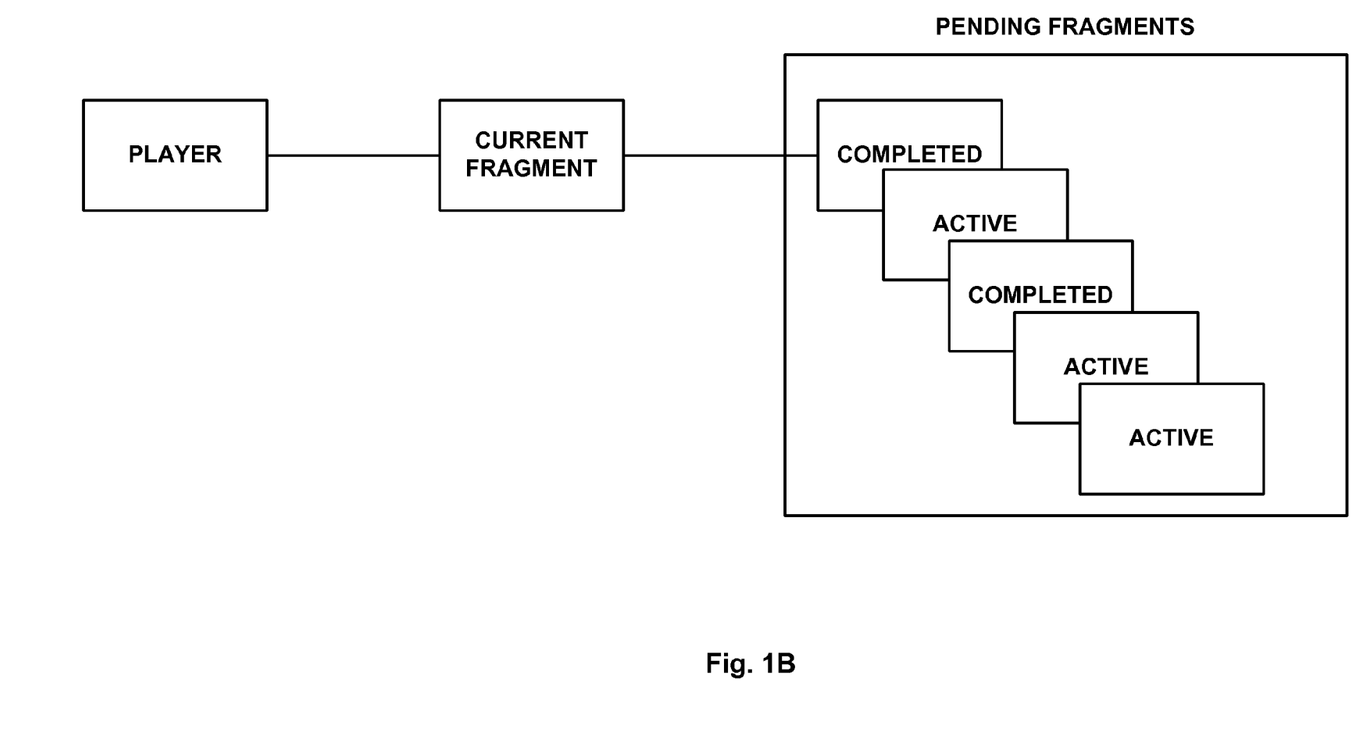
FIG. 1B schematically shows the pending fragments' buffer list.

The session controller keeps a buffer holding the Current Fragment as well as a list of pending fragments (this list is initially empty), as depicted schematically in FIG. 1B.

Figure 2:
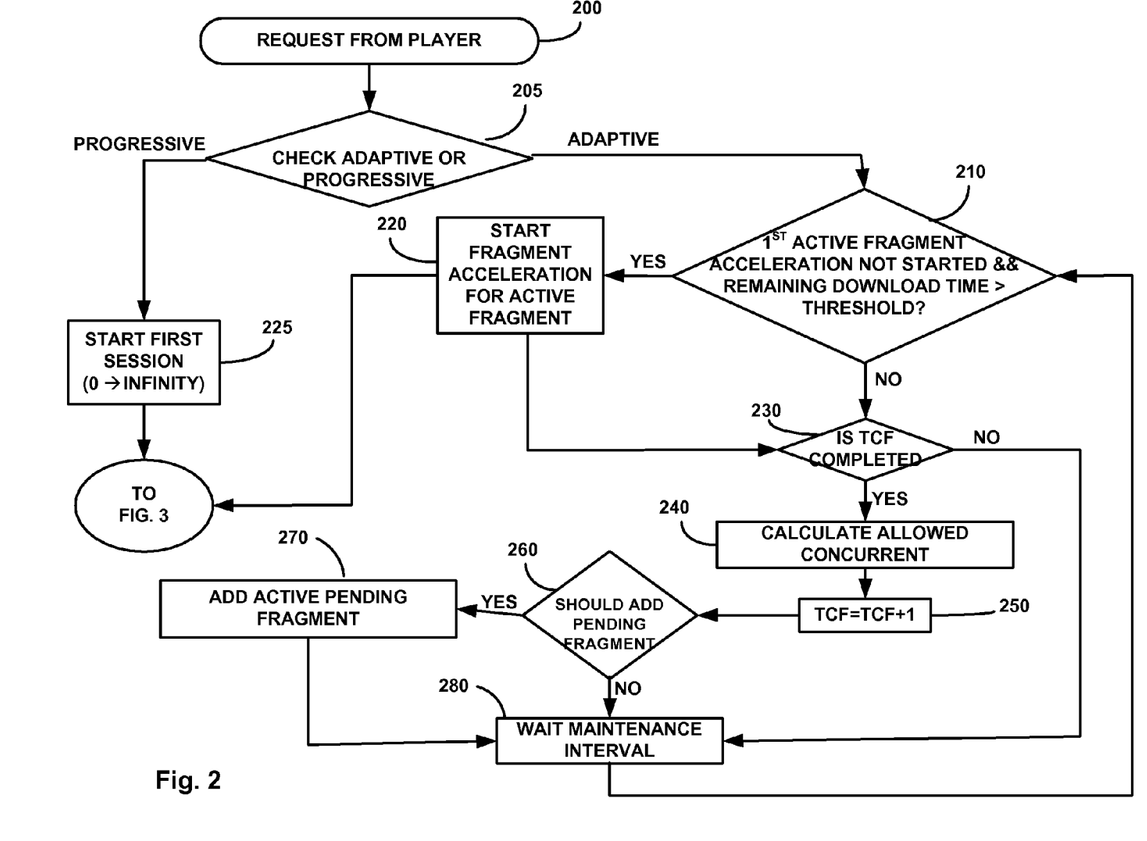
FIG. 2 is a flowchart of the decision processes made by an exemplary session controller.

FIG. 2 is a flowchart of the decision processes made by an exemplary session controller. It starts by receiving 200 a request from the player to download a specified file. The process first checks 205 whether the requested file should be downloaded in a progressive or adaptive session (i.e. if the file is pre-divided into fragments of a given size), according to the file type. It is assumed the controller has knowledge of the manifest/playlist file/s and knows how to retrieve the current quality level.

If the download mode is determined to be adaptive, i.e. predefined fragment sizes, the process checks 210 whether acceleration hasn't started for the $1^{st}$ active fragment and the remaining download time is greater than a certain threshold. If both conditions are met, fragment acceleration for the active fragment is started 220 (In FIG. 3).

The session controller checks 230 in parallel whether the target completed fragment is completed, i.e. the fragment the process is currently waiting to complete download. If it is completed, the process calculates the allowed concurrent number of fragments that may be downloaded without hindering the single fragment's download speed, according to:

Allowed concurrent=(last completed fragment download time/last completed fragment duration)* (Number of Pending Fragments+1).

The TCF, i.e. the fragment for which the process is currently waiting is then incremented by one 250. The process then checks 260 whether it should add pending fragments if the following condition, is true:

(LPF is running for more than 100 ms||LPF is completed) && (PFC<MaxPendingFragments) && (Allowed concurrent>APC+1)||(APC<Allowed concurrent+1) && (LPF remaining time<LPF fragment duration/(PFC+Assurance factor))|| (LPF progress %>100-100/(PC+3)), where MaxPendingFragments is the maximum number of pending fragments. There is no need to retrieve more than the maximum because that data will not be useful.

These conditions assure that the next download is only started when the current download has accomplished at least a certain percentage of the duration defined by the current strategy (adding an assurance factor to avoid making a decision based on random fluctuations) or a certain percentage of the byte count defined by the fragment size.

Pending fragments are then defined (added) as active 270 and the process then waits for maintenance interval 280 and goes back to 210.

When using TCP protocol (or HTTP), the total download speed may be affected by the internal congestion control of the TCP according to the amount of packets retransmitted due to loss.

If the download mode is determined to be progressive, a first session is defined by a default strategy having one fragment of infinite duration 225.

Figure 3:
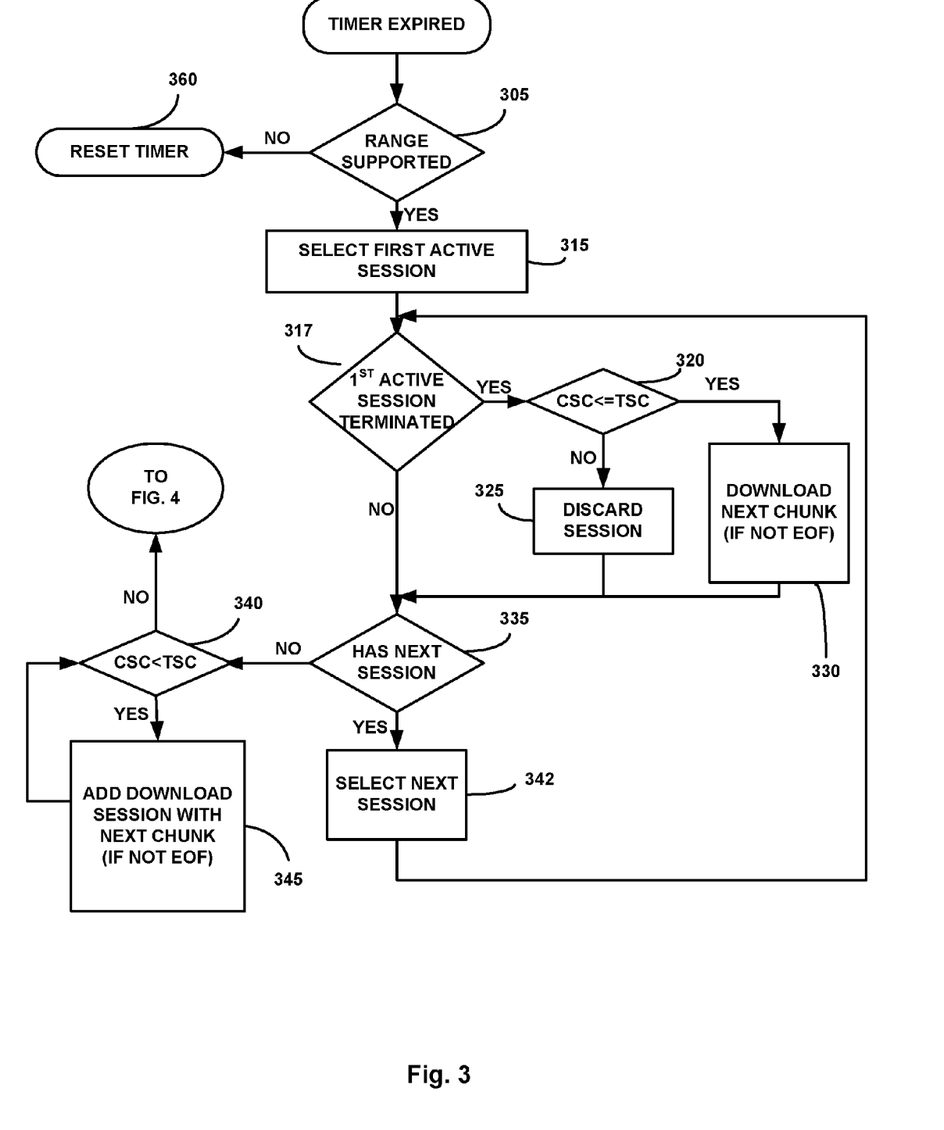
FIG. 3 is a flowchart of a process implementing the strategy selected by the process of FIG. 4.
Figure 4:
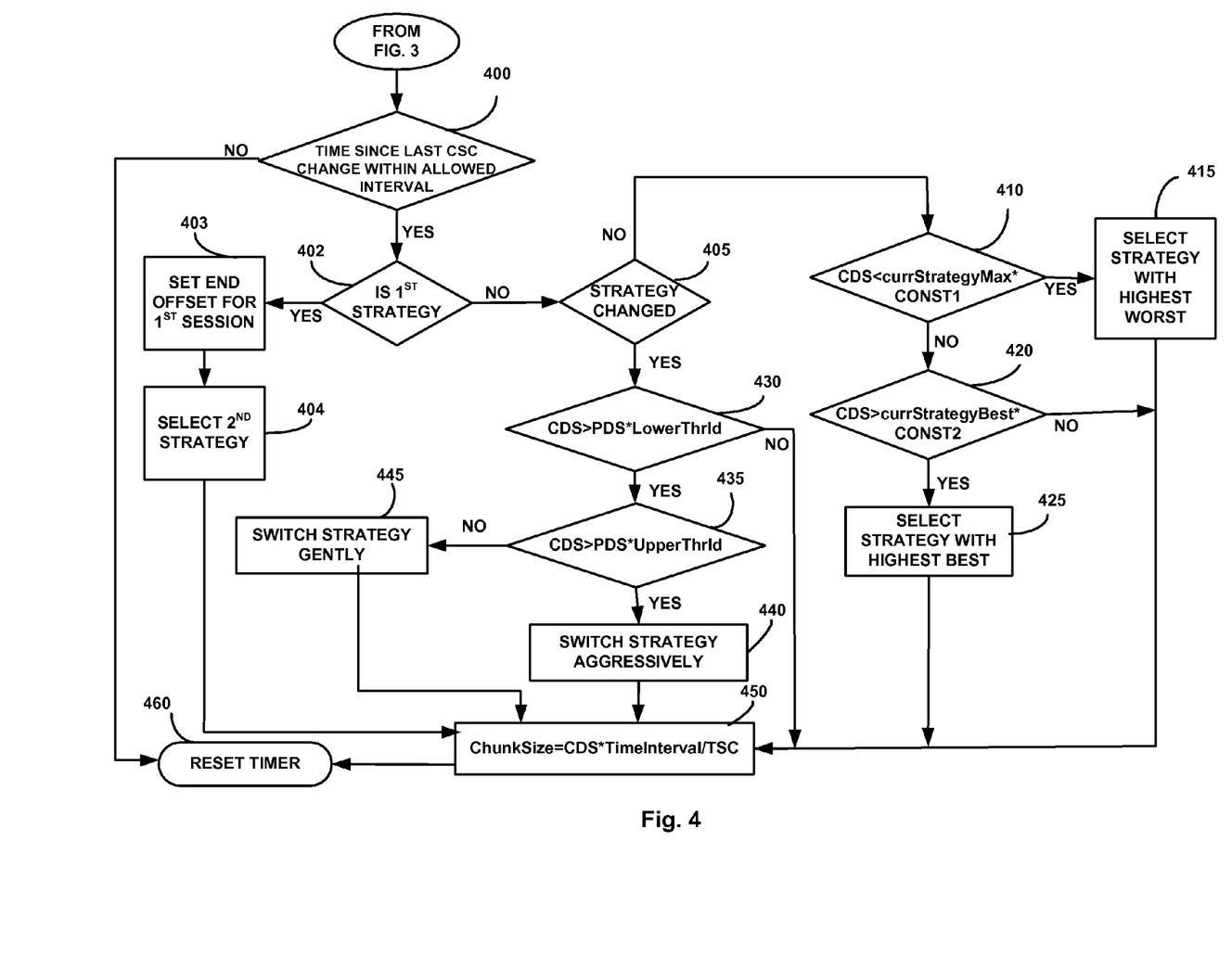
FIG. 4 is a flowchart of another process of the congestion controller determining the best strategy for optimizing the line utilization.

FIG. 3 is a flowchart of implementing the strategy selected by the process of FIG. 4. The process of FIG. 3 is invoked each predefined time interval and makes sure that the CSC (current session count) is equal to the one determined by the process in FIG. 4 and calls the process of FIG. 4 in order to utilize at any given moment the available bandwidth. The process measures the current download rate, compares it to the previously measured download rate and determines how many concurrent sessions should run and the duration of each session.

In step 305 the process checks whether downloading with byte offset is supported by the URL (range request). If partial download is supported, the process goes through a loop that monitors the active sessions' statuses and adds or subtracts sessions from the CSC according to parameters set by the congestion controller. The session controller pulls 315 the first session from the list of active sessions and checks whether it has terminated 317. If the session terminated it will check 320 whether the Current Session Count (CSC) is greater than Target Session Count (TSC). If it is it will discard 325 one session, check whether a next session is available 335 and if it is, select it as active 342. The process then loops back to 317 to check whether the first active session has terminated. Otherwise, if a next session is not available, the process checks 340 whether CSC is less than TSC and if it is, adds 345 a new session with the next chunk, until CSC is equal to TSC. It then goes to FIG. 4 to check the performance of the current strategy.

If in step 320 it is determined that CSC is lesser or equal to Target Session Count (TSC), namely, sessions may be added, the process assigns 330 the next chunk to the current session and goes to 335.

FIG. 4 is a flowchart of a process of the congestion controller determining the best strategy for optimizing the line utilization. The process of FIG. 4 is invoked when no more active sessions are found by the process of FIG. 3. The flowchart describes the process of selecting the most appropriate strategy, in view of external changes (e.g. line changes) or internal changes (the last strategy change made by the system).

The process checks 400 whether the time elapsed since the last change in the CSC is within an allowed time limit. If it is not—the timer is reset 460. The purpose of this checking is to allow enough time between a change of strategy and the checking of its consequences, to stabilize the system.

If enough time has elapsed, the process checks 402 whether the current strategy is the first strategy, namely the default system strategy having one session of infinite duration. If it is—an end offset is set 403 for the first session and a second default strategy is selected 404, having a predefined number of sessions and the process proceeds to calculate 450 a new chunk size according to the formula: ChunkSize=CDS*TimeInterval/TSC, where TimeInterval is typically a few seconds and TSC is determined by the selected strategy.

If the current strategy is not the first strategy, the process checks 405 whether the strategy has changed since last checked. If no strategy change is found, the process proceeds to check whether external changes have affected the communication line and require strategy change. The process checks 410 whether the Current total Download Speed (CDS) is smaller than the currentStrategyMax*CONST1, where CONST1 is a constant representing a percentage. For example, if CONST1=0.8, step 410 checks whether there has been a decline of at least 20% in performance as compared to the maximum throughput of the current strategy. If affirmative—a decision is made to change strategy and the strategy with the highest Worse is selected 415. The process then proceeds to calculate 450 a new chunk size.

Otherwise, if the Current total Download Speed (CDS) is not smaller than the currentStrategyMax*CONST1—the process checks 420 whether the Current total Download Speed (CDS) is greater than the currentStrategyBest*CONST2, where CONST2 is a constant representing a percentage. For example, if CONST2=0.9, step 420 checks whether the current performance is close by 10% to the high limit of the current strategy and the process probably needs to select a strategy with higher best if it exists. If affirmative—a determination is made to change strategy and the strategy with the highest Best is selected 425.

Whether the strategy has been changed or not, the process then proceeds to calculate 450 a new chunk size.

If, in step 405, a strategy change has been made since last checked, the process proceeds to check whether the strategy change has affected the communication line and requires another strategy change. The process checks 430 whether CDS is greater than PDS*lowerThd (predefined lower threshold), namely, has the download speed been improved. If it has, the process then proceeds to check 435 if CDS is greater than PDS*upperThrld (predefined high threshold), namely, has the download speed been improved dramatically. The total session count (TSC) is then increased by 1 445 or multiplied by 2 440, according to the download speed change magnitude. A new chunk size is then calculated 450 and the timer is reset 460.

If in step 430 it is determined that the download speed has not improved since the last strategy change, the process goes to step 450 to recalculate the optimal chunk size and then the timer is reset.

Figure 5:
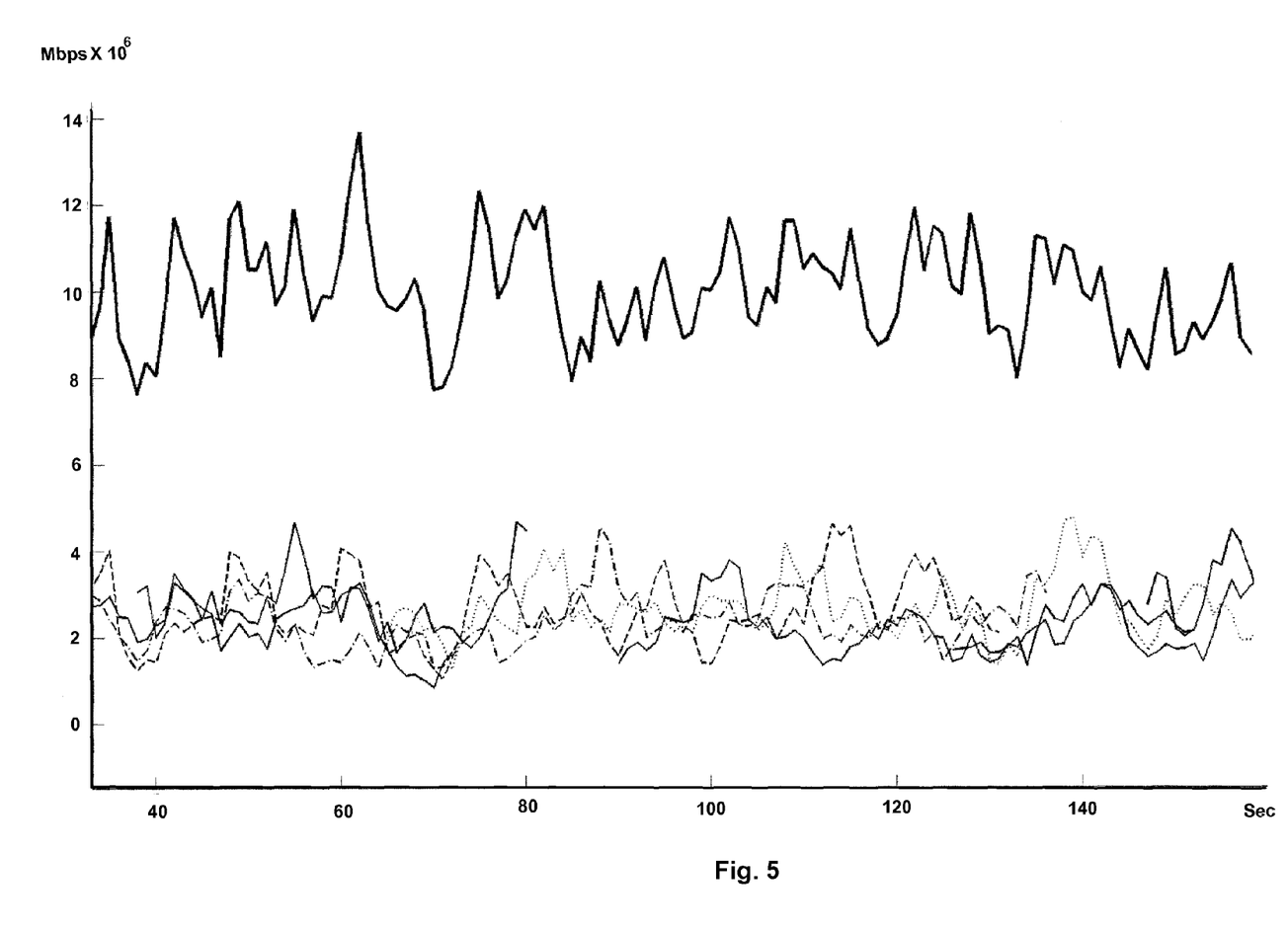
FIG. 5 is a schematic graph demonstrating how using multiple streams gives better performance.

FIG. 5 is a chart showing real results obtained by using multiple dynamic streams according to the method of the present invention.

Figure 6:
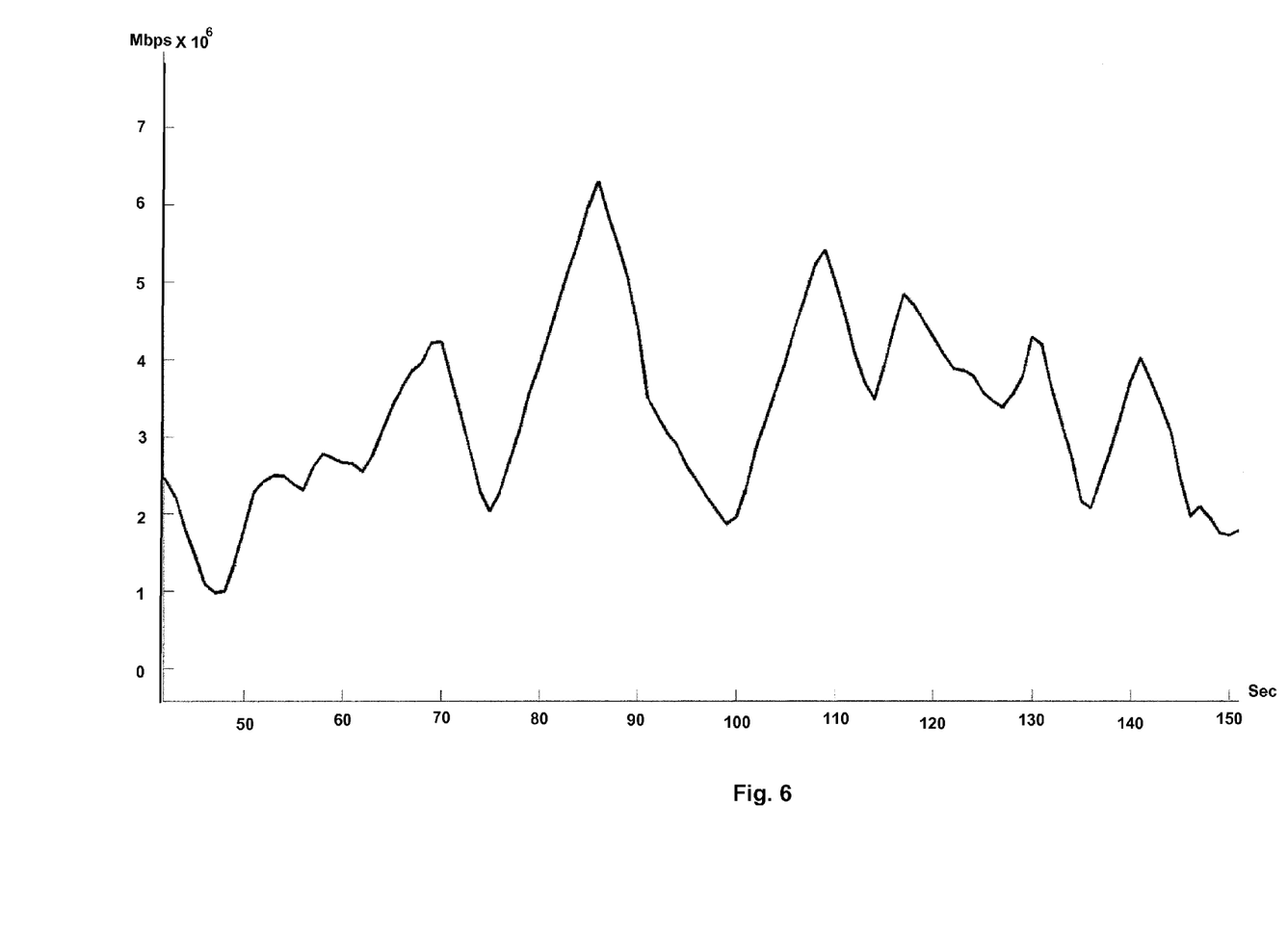
FIG. 6 is a chart showing real results obtained by using a single stream.

FIG. 6 is a chart showing real results obtained by using a single stream. Single stream rate may fall significantly due to momentary high packet loss, however, when using multiple streams the effect on the total rate is not significant (in fact it is reduced with the number of streams). Adding streams without monitoring the total throughput and adjusting the fragment size may end up with all streams having packet loss and the total throughput will be very poor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

The invention claimed is:

1. A congestion control method of dynamically maximizing communication link download throughput, comprising dynamically creating and deleting concurrent download session from URL and dynamically changing the size of data chunks for each session by continuously monitoring the overall congestion status of said link; wherein said monitoring comprises:
   selecting a current strategy defining a number of concurrent download sessions and the duration of each session;
   downloading data from said URL using the current strategy;
   periodically checking whether said defined number of concurrent download sessions are active and whether the current strategy should be replaced by a new strategy, said periodical checking whether the current strategy should be replaced comprising checking whether a strategy change has been performed during a previous period and checking the download throughput accordingly; and
   selecting a new current strategy if said checking indicates a strategy that can better utilize the download throughput.

2. The method of claim 1, wherein said periodical checking whether said defined number of concurrent download sessions are active comprises:
   a. if a first active session has terminated, determining whether to start download of the next data chunk or discard sessions;
   b. if a next download session is pending, defining it as active and repeating step (a); and
   c. adding pending download sessions if current number of sessions is smaller than said total number of concurrent download session defined by the current strategy.

3. The method of claim 1 or 2, comprising, if a strategy change has been performed during said previous period, checking whether the strategy change has affected the communication line and requires another strategy change.

4. The method of any one of claims 1 to 3, wherein said checking download throughput when a strategy change has been performed during said previous period comprises:
   if the currently measured total download speed is greater than the total download speed measured in the previous period, selecting a new strategy comprising an increased number of target concurrent sessions; and
   calculating a new data chunk size.

5. The method of claim 4, wherein said increased number of target concurrent sessions is calculated according to the difference between said currently measured total download speed and said total download speed measured in the previous period.

6. The method of any one of claims 1 to 5, comprising, if no strategy change has been performed during said previous period, checking whether external changes have affected the communication line and require strategy change.

7. The method of any one of claims 1 to 6, wherein checking download throughput when no strategy change has been performed during said previous period comprises:
- if the currently measured total download speed is smaller by at most a predefined percentage than the maximum download speed measured for the current strategy, selecting a new strategy having the highest worst measured download speed;
- if the currently measured total download speed is greater by a at least predefined percentage than a calculated best download speed for the current strategy, selecting a new strategy having the highest best predefined download speed; and
- calculating a new data chunk size.

8. A congestion control system for dynamically maximizing communication link download throughput, comprising a download session controller configured to dynamically create and delete parallel data streams from a URL and dynamically change the size of data fragments for each stream by continuously monitoring the overall congestion status of said link, wherein said download session controller is configured to:
- select a current strategy defining a number of concurrent download sessions and the duration of each session;
- download data from said URL using the current strategy;
- periodically check whether said defined number of concurrent download sessions are active and whether the current strategy should be replaced by a new strategy, said periodical checking whether the current strategy should be replaced comprising checking whether a strategy change has been performed during a previous period and checking the download throughput accordingly; and
- select a new current strategy if said checking indicates a strategy that can better utilize the download throughput.

9. The system of claim 8, wherein said periodical checking whether said defined number of concurrent download session are active comprises:
- a. if a first active session has terminated, determining whether to start download of the next data chunk or discard sessions;
- b. if a next download session is pending, defining it as active and repeating step (a); and
- c. adding pending download sessions if current number of sessions is smaller than said total number of concurrent download session defined by the current strategy.

10. The system of claim 8 or 9, wherein the download session controller is configured to, if a strategy change has been performed during said previous period, check whether the strategy change has affected the communication line and another strategy change is required.

11. The system of any one of claims 8 to 10, wherein said checking download throughput when a strategy change has been performed during said previous period comprises:
- if the currently measured total download speed is greater than the total download speed measured in the previous period, selecting a new strategy comprising an increased number of target concurrent sessions; and
- calculating a new data chunk size.

12. The system of claim 11, wherein said increased number of target concurrent sessions is calculated according to the difference between said currently measured total download speed and said total download speed measured in the previous period.

13. The system of any one of claims 8 to 12, wherein the download session controller is configured to, if no strategy change has been performed during said previous period, check whether external changes have affected the communication line and a strategy change is required.

14. The system of any one of claims 8 to 13, wherein said checking download throughput when no strategy change has been performed during said previous period comprises:
- if the currently measured total download speed is smaller by at most a predefined percentage than the maximum download speed measured for the current strategy, selecting a new strategy having the highest worst measured download speed;
- if the currently measured total download speed is greater by at least a predefined percentage than a calculated best download speed for the current strategy selecting a new strategy having the highest best predefined download speed; and
- calculating a new data chunk size.

15. A computer program product, comprising:
- a computer readable storage medium having computer readable program embodied therein, the computer readable program configured to dynamically create and delete parallel data streams from a URL and dynamically change the size of data for each stream by continuously monitoring the overall congestion status of the link, said computer program configured to: select a current strategy defining a number of concurrent download sessions and the duration of each session;
- download data from said URL using the current strategy;
- periodically check whether said defined number of concurrent download sessions are active and whether the current strategy should be replaced by a new strategy, said periodical checking whether the current strategy should be replaced comprising checking whether a strategy change has been performed during a previous period and checking the download throughput accordingly; and
- select a new current strategy if said checking indicates a strategy that can better utilize the download throughput.

16. The computer program product of claim 15, said periodical checking whether said defined number of concurrent download session are active comprising:
- e. if a first active session has terminated, determining whether to start download of the next data chunk or discard sessions;
- f. if a next download session is pending, defining it as active and repeating step (a); and
- g. adding pending download sessions if current number of sessions is smaller than said total number of concurrent download session defined by the current strategy.

17. The computer program product of claim 15 or 1,. wherein the computer program is configured to, if a strategy change has been performed during said previous period, check whether the strategy change has affected the communication line and another strategy change is required.

18. The computer program product of any one of claims 15 to 17, wherein said checking download throughput when a strategy change has been performed during said previous period comprises:
- if the currently measured total download speed is greater than the total download speed measured in the previous period, selecting a new strategy comprising an increased the number of target concurrent sessions; and
- calculating a new data chunk size.

19. The computer program product of claim 18, wherein said increased number of target concurrent sessions is calculated according to the difference between said currently measured total download speed and said total download speed measured in the previous period.

20. The computer program product of any one of claims 15 to 19, wherein the computer program is configured to, if no strategy change has been performed during said previous period, check whether external changes have affected the communication line and a strategy change is required.

21. The computer program product of any one of claims 15 to 20, wherein said checking download throughput when no strategy change has been performed during said previous period comprises:
- if the currently measured total download speed is smaller by at most a predefined percentage than the maximum download speed measured for the current strategy, selecting a new strategy having the highest worst measured download speed;
- if the currently measured total download speed is greater by at least a predefined percentage than a calculated best download speed for the current strategy, selecting a new strategy having the highest best predefined download speed; and
- calculating a new data chunk size.

\* \* \* \* \*